Sept. 5, 1939.  H. A. WINTERMUTE  2,171,617
GAS TREATMENT
Filed Feb. 13, 1937
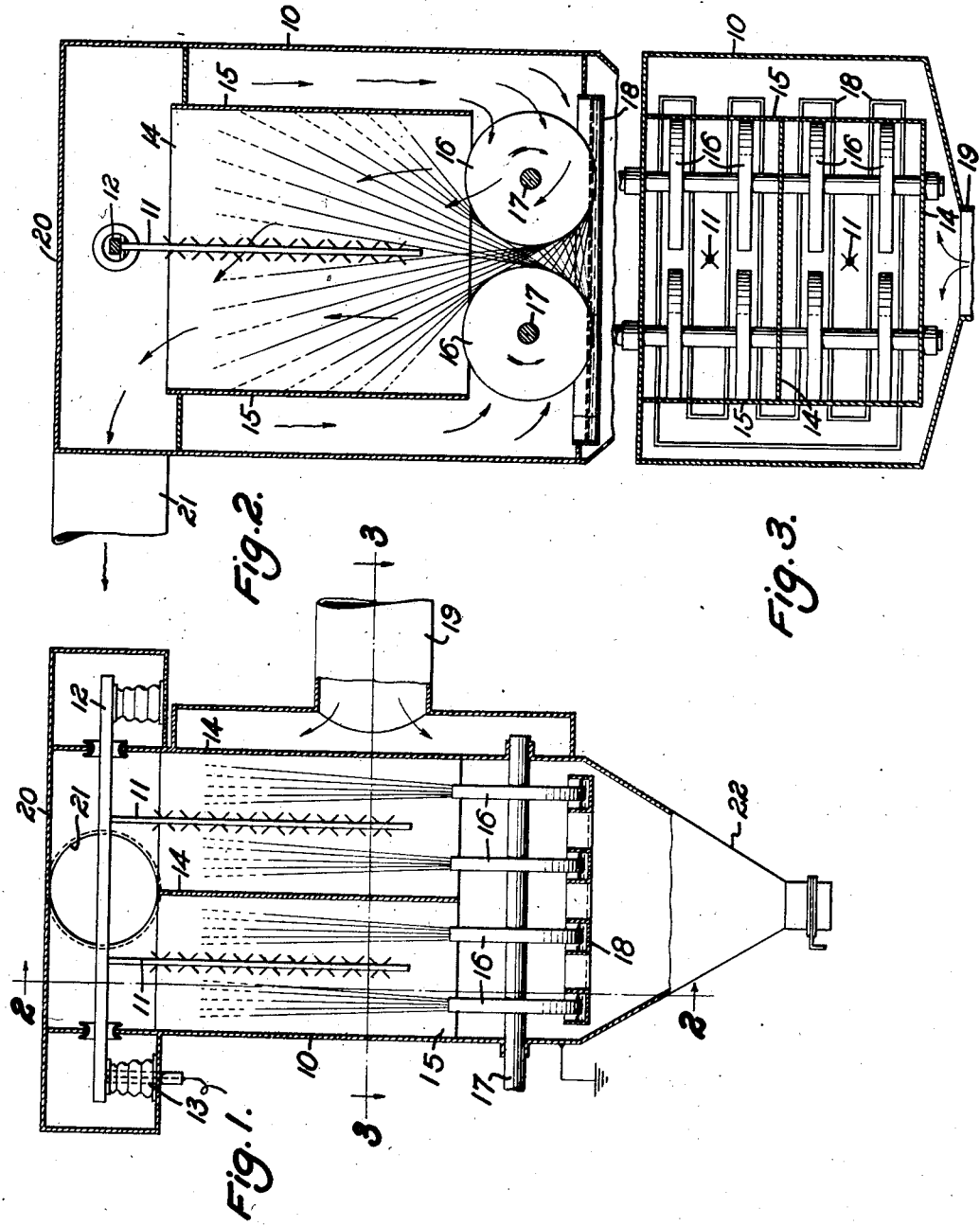
Inventor:
Harry A. Wintermute
By Potter, Pierce & Scheffler
Attorneys.

Patented Sept. 5, 1939

2,171,617

UNITED STATES PATENT OFFICE 2,171,617

GAS TREATMENT

Harry A. Wintermute, Plainfield, N. J., assignor to Research Corporation, New York, N. Y., a corporation of New York Application February 13, 1937, Serial No. 125,641

10 Claims. (Cl. 183—7)

This invention relates to the treatment of gases and liquids and is more particularly directed to the methods and means of contacting gases and liquids under the influence of a high tension electric field.

Broadly stated, the invention comprises process and apparatus whereby a liquid is projected into a gas between opposed high tension electrode members.

A principal purpose of the invention is the provision of means whereby gases may be more effectively subjected to contact with liquids while in a high tension electric field.

A further object of the invention is the provision of means whereby gases may be cleaned, purified or otherwise treated by subjecting it to contact with an extended surface of liquid under the influence of a high tension electric field.

A further object of the invention is the provision of means for contacting a liquid in finely divided or highly extended condition with a gas under the influence of a high tension electric field.

The immediate purpose of the various uses to which the invention may be put may involve the modification of either the liquid or the gas or both, but in any case the fundamental effect of the invention is to bring about a highly effective and extended contact of gas and liquid in a strong electric field.

A characteristic feature of the invention comprises the projection of a liquid into a gas positioned between complementary high tension electrode members, in an extended stream substantially parallel to the electrodes, and preferably adjacent to, but out of substantial contact with, the electrode under high potential with respect to ground.

The definite direction and position of the attenuated stream of liquid which is characteristic of the invention is obtained by the use of suitable projecting means. Rotating cylinders or cylindrical discs, particularly paired, oppositely rotating cylindrical members have been found to be especially suitable for producing the restricted liquid streams characterizing the invention, although the invention is not limited in its broader aspects to any particular means for producing such streams.

An important use of the invention is in the cleaning and purification of gases and the invention will be more particularly described, for the purpose of illustration, with reference to the accompanying drawing showing apparatus suitable for such use.

In the drawing:

Fig. 1 is an elevation in partial section of an apparatus embodying the principles of the invention;

Fig. 2 is a partial sectional elevation on line 2—2 of Fig. 1; and

Fig. 3 is a horizontal section on line 3—3 of Fig. 1.

In the drawing, 10 is the shell of an electrical treating apparatus. High tension discharge members 11, consisting of stiff rod-like elements provided with prongs, are supported on bars 12 which are connected to a source of high potential direct current through a supporting insulator 13. Plates 14 and 15, together with the portion of shell 10 opposed to the discharge elements 11, form collecting electrode surfaces which are preferably at ground potential.

Paired sets of cylindrical discs 16 are mounted on rotatable shafts 17 and dip into troughs 18 in which a suitable liquid may be maintained at any desired level, for example, by means of conventional float valve mechanism, not shown.

The gas to be contacted with liquid in the electric field, for example, a gas containing suspended particles to be removed, is led into the apparatus through conduit 19, passes to each side of the treating chamber and under the lower ends of plates 15 into the space between the complementary electrodes. Passing upwards through the electric field into header 20, the gas leaves the apparatus through conduit 21.

The liquid which is to be brought into contact with the gas in the electric field is maintained at the proper level in troughs 18 and when the speed of rotation of the discs 16 is suitably adjusted the liquid is projected into the space between the electrodes in the form of a relatively narrow sheet of spray. Using paired discs, 15 inches in diameter and rotating in opposite directions as indicated in Fig. 2 of the drawing, it has been found that a very satisfactory projection of spray is obtained with a speed of about 1,000 R. P. M. In general, with oppositely spaced cylinders or cylindrical discs, it is desirable to operate the discs as at sufficiently high speed to throw off the liquid at an angle of less than 90° from the horizontal.

Other spray means, such as nozzles, capable of producing well-defined and controllable sheets or pencils of projected liquid spray may be used in place of the rotating discs illustrated in the example. For some purpose a single disc may be satisfactory instead of two discs as illustrated, or one of the discs may be at a higher elevation than the other so that only one disc dips into the liquid.

In the interelectrode space, the gas and liquid are brought into thorough contact. Due to the electrical windage effect, operating at right angles to the flow of the gas and liquid, this contact is much more effective than in the absence of the electrical field. The electrical field also causes the liquid particles, together with any substances which they have dissolved or absorbed from the gas as well as all the solid or liquid particles suspended in the gas or precipitated therein by the interaction of the gas and liquid, to be deposited on the collecting electrode surfaces. The collected material flows down the collecting surfaces and drops off into the receiving pan 22 of the apparatus from which it may be withdrawn as desired.

The gas may flow upward as shown, or it may flow downward countercurrent to the liquid spray, or it may be passed through the treating chamber in a horizontal direction, and other modifications of the illustrative arrangement shown in the drawing will readily occur to those skilled in the art.

By the method and apparatus of the invention a large amount of liquid may be contacted with the gas, if desired, without causing troublesome arc-overs and short circuits since the position of the projected liquid stream is adjusted and controlled to avoid striking the high tension electrode, while it may be brought so close to this electrode that the influence of the electric field causes the liquid to be transported across the interelectrode space and this brings it into thorough intimate contact with the gas traversing the interelectrode space. The liquid is finally driven on to the collecting electrode surfaces, where it forms a liquid film which washes down the surfaces and keeps them free from deposit. The spray particles are deposited on the surfaces promiscuously and the formation of dry spots on the surfaces is thus avoided.

Due to the positioning of the sheets of spray between the complementary electrode members, the sheets tend to act as auxiliary or intermediate collecting electrodes, and to collect and hold dust, fume or liquid particles precipitated thereinto by the action of the electric field.

While an important use of the invention is the removal of suspended solid and liquid particles out of gases, many other fields of use are also possible in which the characteristic novel features of the invention are particularly advantageous.

It may be used for the separation of one liquid from a mixture of liquids by evaporation or distillation. For example, in the removal of water from a tar emulsion by means of hot gases, the electric field will effectively prevent the escape of the dehydrated tar.

The invention is also suitable for aerating sewage or other liquid to remove odors or destroy bacteria, in which case the electric field prevents the escape of solid or liquid particles. A similar advantage is presented in the treatment of a gas with a liquid to remove a constituent from the gas, for example, in the dehumidification of air by spraying a water absorbing liquid, such as calcium chloride brine, into the air.

I claim:

1. Method for the treatment of gases and liquids comprising passing a gas through a high tension electric field maintained between opposed complementary electrodes and projecting an extended stream of liquid particles into said gas adjacent to the high tension electrode but not in contact therewith.

2. Apparatus for the treatment of gases and liquids comprising opposed discharge and collecting electrode members, means for passing a gas between said electrode members, a container for liquid adjacent said electrode members and rotatable cylindrical members positioned to dip into said liquid and project it into the space between the electrode members.

3. Apparatus for the treatment of gases and liquids comprising opposed discharge and collecting electrode members, means for passing a gas between said electrode members, a container for liquid adjacent said electrode members, and paired rotatable cylindrical members positioned to dip into said liquid and project it into the space between the electrode members.

4. Apparatus for the treatment of gases and liquids comprising opposed discharge and collecting electrode members, means for passing a gas between said electrode members, a container for liquid below said electrode members, and paired rotatable cylindrical members positioned to dip into said liquid and project it into the space between the electrode members.

5. Apparatus for the treatment of gases and liquids comprising opposed discharge and collecting electrode members, means for passing a gas between said electrode members, means providing a pool of liquid adjacent said electrode members and means for projecting a controlled extended stream of liquid particles from said pool into the space between said electrode members without impingement thereon.

6. Apparatus for the treatment of gases and liquids comprising opposed discharge and collecting electrode members, means for passing a gas between said electrode members, means providing a pool of liquid adjacent said electrode members and paired rotatable cylindrical members positioned to dip into said pool of liquid and adapted to project an extended stream of liquid particles into the space between said electrode members without impingement thereon.

7. Apparatus for the treatment of gases and liquids comprising opposed discharge and collecting electrode members, means for passing a gas between said electrode members, means providing a pool of liquid adjacent said electrode members and paired rotatable cylindrical members positioned to dip into said pool of liquid and adapted to project a sheet of liquid particles between said electrode members and in a direction parallel thereto and spaced therefrom.

8. Apparatus for the treatment of gases and liquids comprising opposed discharge and collecting electrode members, means for passing a gas between said electrode members, and means for projecting a stream of liquid between said electrode members without substantial impingement on said discharge electrode member.

9. Apparatus for the treatment of gases and liquids comprising opposed discharge and collecting electrode members, means for passing a gas between said electrode members, and means for projecting a stream of liquid upwardly between said electrode members without substantial impingement on said discharge electrode member.

10. Method for the treatment of gases and liquids comprising passing a gas through a high tension electric field maintained between a discharge electrode and an extended surface collecting electrode and maintaining an extended sheet of liquid in the gas adjacent to said discharge electrode but not in contact therewith.

HARRY A. WINTERMUTE.